United States Patent
Huang et al.

(10) Patent No.: US 12,550,436 B2
(45) Date of Patent: Feb. 10, 2026

(54) ARRAY SUBSTRATE COMPRISING COLOR RESISTANCE LAYER, METHOD FOR MANUFACTURING ARRAY SUBSTRATE AND DISPLAY PANEL

(71) Applicant: TCL CHINA STAR OPTOELECTRONICS TECHNOLOGY CO., LTD., Guangdong (CN)

(72) Inventors: Lei Huang, Guangdong (CN); Shumin Tang, Guangdong (CN); Liu Yang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 463 days.

(21) Appl. No.: 17/756,636

(22) PCT Filed: Apr. 29, 2022

(86) PCT No.: PCT/CN2022/090107
§ 371 (c)(1),
(2) Date: Sep. 28, 2022

(87) PCT Pub. No.: WO2023/178794
PCT Pub. Date: Sep. 28, 2023

(65) Prior Publication Data
US 2024/0162245 A1  May 16, 2024

(30) Foreign Application Priority Data
Mar. 25, 2022 (CN) .......................... 202210305114.1

(51) Int. Cl.
*H10D 86/60* (2025.01)
*G02F 1/1362* (2006.01)
(Continued)

(52) U.S. Cl.
CPC .......... *H10D 86/60* (2025.01); *H10D 86/021* (2025.01); *H10D 86/451* (2025.01); *G02F 1/136222* (2021.01); *G02F 1/136286* (2013.01)

(58) Field of Classification Search
CPC .................... G02F 1/136213; G02F 1/136286
See application file for complete search history.

(56) References Cited

U.S. PATENT DOCUMENTS

| | | | |
|---|---|---|---|
| 2012/0044434 A1 | 2/2012 | Yoon | |
| 2016/0202582 A1* | 7/2016 | Paek | G02F 1/136209 438/158 |

(Continued)

FOREIGN PATENT DOCUMENTS

| | | |
|---|---|---|
| CN | 1570745 A | 1/2005 |
| CN | 1808252 A | 7/2006 |

(Continued)

OTHER PUBLICATIONS

International Search Report in International application No. PCT/CN2022/090107, mailed on Aug. 29, 2022.

(Continued)

*Primary Examiner* — Lauren Nguyen
(74) *Attorney, Agent, or Firm* — PV IP PC; Christopher S. Ruprecht; Wei Te Chung

(57) ABSTRACT

Disclosed is an array substrate, a method for manufacturing an array substrate, and a display panel. The array substrate includes a substrate layer, a common electrode layer, and a color resistance layer. A first groove and a second groove are formed on a side surface of the color resistance layer away from the substrate layer. A data masking line layer and a pixel electrode layer are formed on the color resistance layer. A part of the data masking line layer is located in the first groove, and another part of the pixel electrode layer is (Continued)

located in the second groove to form a first capacitance with the data masking line layer in the first groove.

17 Claims, 2 Drawing Sheets

(51) Int. Cl.
*H10D 86/01* (2025.01)
*H10D 86/40* (2025.01)

(56) References Cited

U.S. PATENT DOCUMENTS

| | | | | |
|---|---|---|---|---|
| 2018/0331129 | A1* | 11/2018 | Gu | H10B 12/31 |
| 2018/0366492 | A1 | 12/2018 | Zhou | |
| 2023/0107063 | A1* | 4/2023 | Yao | G02F 1/136286 257/91 |

FOREIGN PATENT DOCUMENTS

| | | | | | |
|---|---|---|---|---|---|
| CN | 10-3676374 | * | 3/2014 | | G02F 1/1362 |
| CN | 103676374 | A | 3/2014 | | |
| CN | 104701302 | A | 6/2015 | | |
| CN | 10-4916648 | | * | 9/2015 | H01L 27/12 |
| CN | 105487315 | A | 4/2016 | | |
| CN | 106125436 | A | 11/2016 | | |
| CN | 107154406 | A | 9/2017 | | |
| CN | 111090203 | A | 5/2020 | | |
| CN | 112433414 | A | 3/2021 | | |
| CN | 113504680 | A | 10/2021 | | |
| KR | 20110068272 | A | 6/2011 | | |
| WO | WO/2016/197692 | | * | 12/2015 | G02F 1/1362 |
| WO | PCT/CN2020/101633 | | * | 8/2020 | G02F 1/1362 |

OTHER PUBLICATIONS

Written Opinion of the International Search Authority in International application No. PCT/CN2022/090107,mailed on Aug. 29, 2022.

Chinese Office Action issued in corresponding Chinese Patent Application No. 202210305114.1 dated May 27, 2023, pp. 1-7.

* cited by examiner

ARRAY SUBSTRATE COMPRISING COLOR RESISTANCE LAYER, METHOD FOR MANUFACTURING ARRAY SUBSTRATE AND DISPLAY PANEL

TECHNICAL FIELD

The present application relates to a field of display technology, in particular to an array substrate, a method for manufacturing an array substrate, and a display panel.

BACKGROUND

In current liquid crystal display (LCD), color on array (COA) process is usually adopted by the industry based on aperture ratio and penetration of high-resolution products as well as curved surface application scenarios, COA process means forming a RGB (red, green, blue, three primary colors) color resistance layer on an array substrate. This process can reduce color resistance shift caused by an alignment shift of upper and lower substrates and simplify fabrication process of a color film (CF) substrate.

However, in this process, a color resistance layer is fabricated between pixel electrodes and a common electrode, which will increase distance between the pixel electrodes and the common electrode, resulting in a decrease in storage capacitance, which will lead to problems of poor display such as flicker and crosstalk.

Technical Problem

The present application provides an array substrate to solve problems of poor display in the prior art such as flicker and crosstalk caused by decrease of storage capacitance due to increase of distance between pixel electrodes and a common electrode when a color resistance layer is fabricated between the pixel electrodes and the common electrode.

Technical Solution

According to a first aspect, embodiments of the present application provide an array substrate, which comprises:
a substrate layer on which a common electrode layer is formed;
a color resistance layer formed on the common electrode layer, and a first groove and a second groove are formed on a side surface of the color resistance layer away from the substrate layer;
a data masking line layer comprising a data masking line formed on the color resistance layer, and a part of the data masking line is located in the first groove; and
a pixel electrode layer comprising pixel electrodes formed on the color resistance layer and disposed insulated from the data masking line, and a part of the pixel electrodes are located in the second groove to form a first capacitance with the data masking line in the first groove.

In the array substrate, the first capacitance is smaller than a second capacitance formed by the pixel electrodes and the common electrode layer.

In the array substrate, a width of the first groove is equal to a width of the second groove.

In the array substrate, a depth of the first groove is equal to a depth of the second groove.

In the array substrate, the color resistance layer has a thickness of 2 μm to 3 μm.

In the array substrate, the depth of the first groove and the second groove is from 0.5 μm to 2 μm.

In the array substrate, the data masking line and the pixel electrodes are disposed in the same layer.

In the array substrate, a material of the data masking line is the same as that of the pixel electrodes.

In the array substrate, the material of the data masking line and the pixel electrodes is selected from any one of ITO, IGZO, and ITO/Ag/ITO laminated material.

In the array substrate, a data line is further disposed between the common electrode layer and the color resistance layer, and a projection of the data line on the substrate layer is located within a projection range of the data masking line on the substrate layer.

According to a second aspect, embodiments of the present application further provide a method for fabricating an array substrate, which comprises steps of:
forming a common electrode layer on a substrate layer;
forming a color resistance layer on the common electrode layer, and forming a first groove and a second groove on a side surface of the color resistance layer away from the substrate layer; and
forming a data masking line layer and a pixel electrode layer on the color resistance layer, wherein a part of the data masking line layer is formed in the first groove, and a part of the pixel electrode layer is formed in the second groove and forms a first capacitance with the part of the data masking line layer.

In the method for fabricating an array substrate, before the step of forming a color resistance layer on the common electrode layer, the method further comprises steps of:
forming an insulating layer on the common electrode layer;
forming an active layer on the insulating layer;
forming a source and a drain on the active layer; and
forming a passivation layer on the source and drain layer.

In the method for fabricating an array substrate, a data line is further formed when forming the source and drain.

In the method for fabricating an array substrate, the pixel electrode layer comprises pixel electrodes, and a part of the pixel electrodes and the common electrode layer form a second capacitance.

In the method for fabricating an array substrate, the step of forming a data masking line layer and a pixel electrode layer on the color resistance layer comprises forming the data masking line layer and the pixel electrode layer on the same layer with the same material.

According to a third aspect, embodiments of the present application further provide a display panel comprising the array substrate described in the above embodiments.

Technical Effects

Compared with the prior art, in the present application, a first groove and a second groove are disposed on a color resistance layer, a part of pixel electrodes are formed in the first groove, and another part of pixel electrodes are formed in the second groove, so that the data masking line located in the first groove and pixel electrodes located in the second groove form a first capacitance, thereby increasing capacitance of storage capacitance in a display panel, which is used to solve problems of poor display in the prior art such as flicker and crosstalk caused by decrease of capacitance of the second capacitor (that is, decrease of capacitance of a storage capacitor) due to increase of distance between pixel electrodes and a common electrode when a color resistance layer is fabricated between the pixel electrodes and the common electrode, and to ensure stability of a display image.

DETAILED DESCRIPTION

The present application provides an array substrate, a method for manufacturing an array substrate, and a display panel. In order to more clearly describe the object, technical solutions, and effects of the present application, the present application will be further explained in detail with reference to the attached drawings and embodiments. It should be understood that specific embodiments described herein are merely intended to explain the present application and are not intended to limit the present application.

Figure 1:
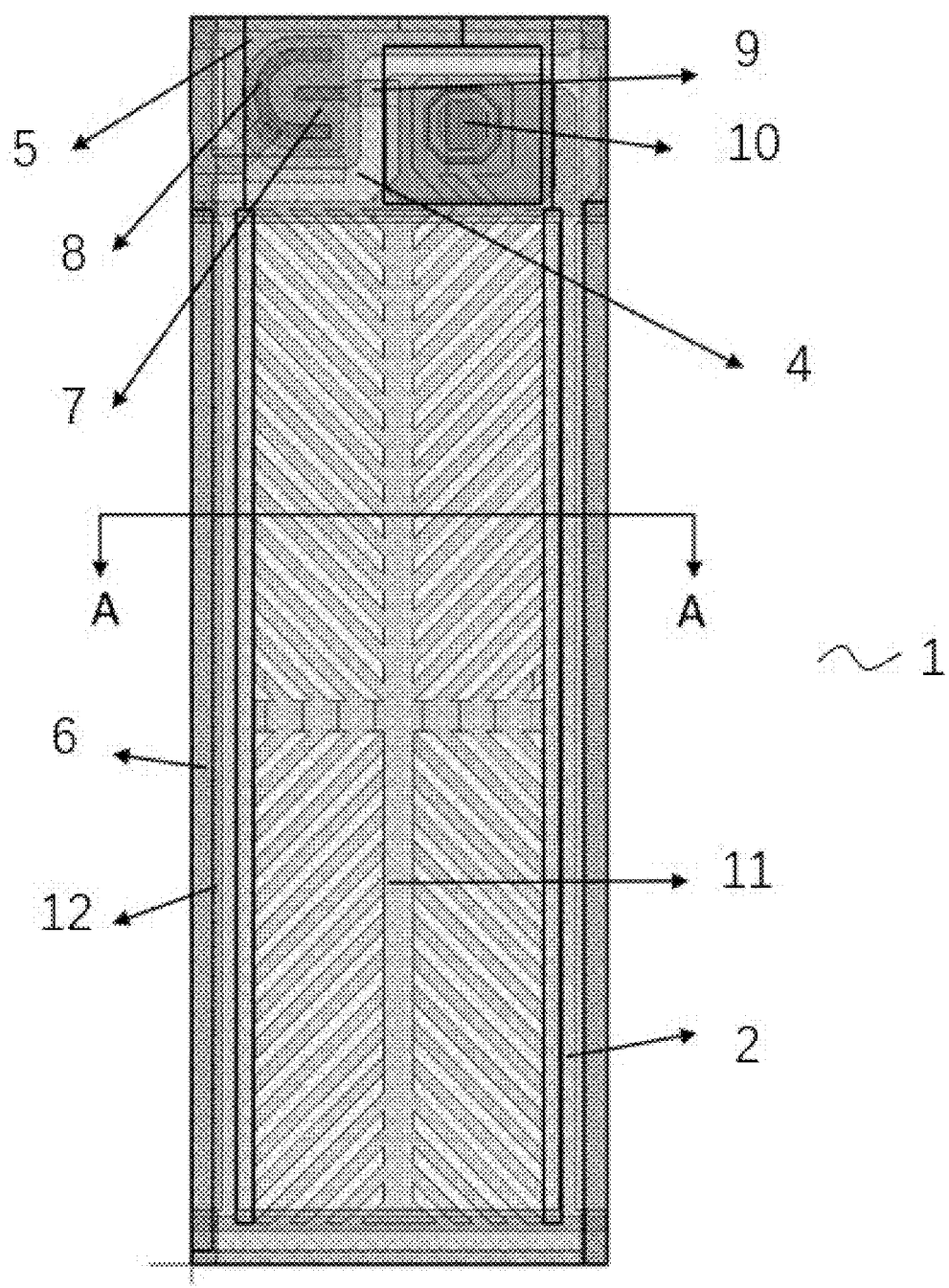
FIG. 1 is a schematic cross-sectional view of an array substrate provided by the present application.
Figure 2:
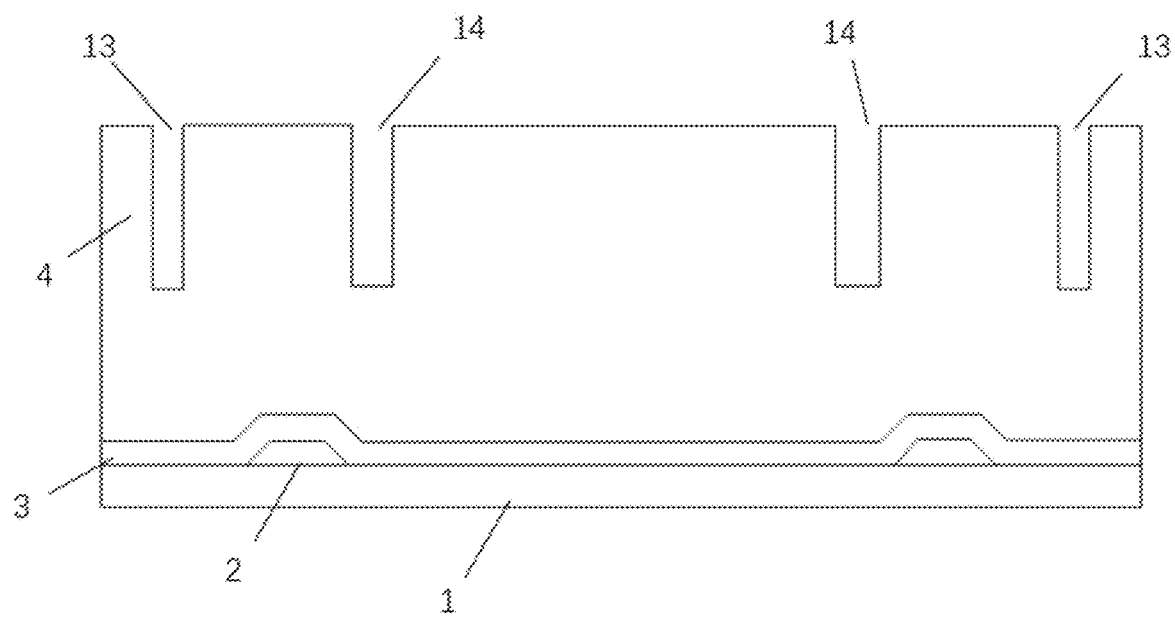
FIG. 2 is a schematic cross-sectional view of a first groove and a second groove of the array substrate provided by the present application.
Figure 3:
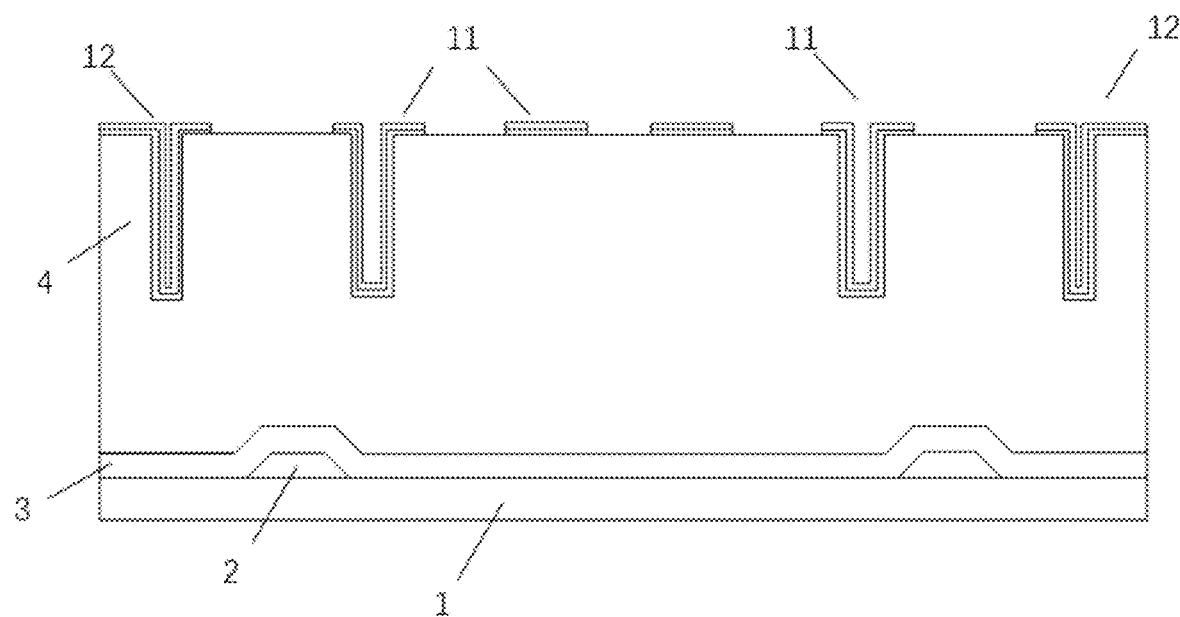
FIG. 3 is a schematic cross-sectional view of a data masking line and pixel electrodes of the array substrate provided by the present application.

Referring to FIG. 1, FIG. 2, and FIG. 3, embodiments of the present application provide a method for manufacturing an array substrate, which comprises steps of:

forming a common electrode layer on a substrate layer 1;

forming a color resistance layer 4 on the common electrode layer, and forming a first groove 13 and a second groove 14 on a side surface of the color resistance layer 4 away from the substrate layer 1; and forming a data masking line layer and a pixel electrode layer on the color resistance layer 4, and it is known that the data masking line layer comprises a data masking line 12, and the pixel electrode layer comprises pixel electrodes 11, wherein a part of the data masking line 12 are formed in the first groove 13 and a part of the pixel electrodes 11 are formed in the second groove 14.

It can be known that the common electrode layer comprises a common electrode 2, the data masking line 12 in the first groove 13 and the pixel electrodes 11 in the second groove 14 form a first capacitance, the pixel electrodes 11 and the common electrode 2 form a second capacitance, and the first capacitance and the second capacitance together form a storage capacitance in the display panel.

The present embodiment provides a method for fabricating an array substrate, in which a first groove 13 and a second groove 14 are disposed on a color resistance layer 4, data masking line 12 are formed on the color resistance layer 4 and a part of the data masking line 12 are located in the first groove 13, and pixel electrodes 11 are formed on the color resistance layer 4 and a part of the pixel electrodes 11 are located in the second groove 14, so that the data masking line located in the first groove 13 and pixel electrodes located in the second groove 14 form a first capacitance, which is used to solve problems of poor display in the prior art such as flicker and crosstalk caused by decrease of capacitance of the second capacitor due to increase of distance between pixel electrodes 11 and a common electrode 2 when a color resistance layer 4 is fabricated between the pixel electrodes 11 and the common electrode 2, and to ensure stability of a display image.

Specifically, in the method shown in the above embodiments, when the common electrode 2 is formed on the substrate layer 1, a gate 5 and gate lines are formed at the same time. It can be known that the gate 5 and gate lines are electrically connected.

The above steps may be carried out by an etching method commonly used in the art, such as depositing a first metal layer on the substrate layer 1, and etching the first metal layer after photoresist process to obtain the above-described common electrode 2, gate 5, and gate lines, a material of the first metal layer is usually selected from copper (Cu), aluminum (Al), and a combination thereof.

It can be known that the substrate layer 1 may comprise a single-layer insulating material such as glass, quartz and a polymer resin, or a multi-layer insulating material such as a double-layer polymer resin. The substrate layer 1 may be rigid or flexible, and carries a film layer disposed thereon.

After the common electrode 2 and the gate 5 are formed, it is necessary to form an insulating layer 3 covering a structure after etching of the first metal layer. The insulating layer 3 may be fabricated by a chemical vapor deposition method commonly used in the art, such as depositing an insulating material on the substrate layer 1 to cover the common electrode 2, the gate 5, and the gate lines. The insulating material is usually selected from silicon nitride (SiNx), silicon oxide (SiOx), and a combination thereof.

After the insulating layer 3 is formed, a semiconductor material layer is deposited on the insulating layer 3 by a chemical vapor deposition method, and the semiconductor material layer is etched to form an active layer 7. A second metal layer is deposited on the active layer 7, and the second metal layer is etched to form a source 8, a drain 9, and data line 6, wherein the data line 6 is electrically connected with the source 8. It can be known that the data line 6 can be connected with the drain 9 or may be connected with the source 8. This embodiment is described by way of example only and does not constitute a limitation. It can be known that the gate 5, the active layer 7, the drain 9 and the source 8 constitute a thin film transistor (TFT). It can be known that a passivation layer needs to be covered before the color resistance layer 4 is formed on the source 8, the drain 9 and the data line 6, and the passivation layer can also be fabricated by a chemical vapor deposition method, details will not be repeated here.

Specifically, forming the color resistance layer 4 on the common electrode 2 comprises steps of depositing a color resistance material on the passivation layer, etching the color resistance material to form the color resistance layer 4, and forming the first groove 13 and the second groove 14 on a side surface of the color resistance layer 4 away from the substrate layer 1.

Specifically, in order to form the data masking line 12 and the pixel electrodes 11 on the color resistance layer 4, a transparent conductive material layer may be deposited on the color resistance layer 4. Similarly, the data masking line 12 and the pixel electrodes 11 can be obtained after the transparent conductive material layer is etched. It can be known that a projection of the data masking line 12 on the substrate layer 1 is located within a projection profile of the data masking line 12 on the substrate layer 1. Since the first groove 13 and the second groove 14 are formed on the color resistance layer 4, and the transparent conductive material will also be deposited in the first groove 13 and the second groove 14 during deposition, so the data masking line 12 further comprises a part of the data masking line that is deposited in the first groove 13, and the pixel electrodes 11 further comprises a part of the pixel electrodes that are deposited in the second groove 14. It can be known that the pixel electrodes 11 need to be connected with the drain 9 to receive data signal from the data line 6. Therefore, in the above steps, a via hole 10 will be formed to electrically connect the pixel electrodes 11 with the drain 9.

This embodiment provides an array substrate, which comprises:

- a substrate layer 1 on which a common electrode layer is formed, wherein the common electrode layer comprises a common electrode 2;
- a color resistance layer 4 formed on the common electrode layer, and a first groove 13 and a second groove 14 are formed on a side surface of the color resistance layer away from the substrate layer 1;
- a data masking line layer comprising a data masking line 12 formed on the color resistance layer, and a part of the data masking line 12 is located in the first groove 13; and
- a pixel electrode layer comprising pixel electrodes 11 formed on the color resistance layer 4 and disposed insulated from the data masking line 12, and a part of the pixel electrodes 11 are located in the second groove 14 to form a first capacitance with the data masking line 12 in the first groove 13.

The present embodiment provides an array substrate, in which a first groove 13 and a second groove 14 are disposed on a color resistance layer 4 of the array substrate, a data masking line 12 is formed on the color resistance layer 4 and a part of the data masking line 12 is located in the first groove 13, pixel electrodes 11 are formed on the color resistance layer 4 and a part of the pixel electrodes 11 are located in the second groove 14, and the data masking line 12 located in the first groove 13 and the pixel electrodes 11 located in the second groove 14 form a first capacitance, which is used to solve problems of poor display in the prior art such as flicker and crosstalk caused by decrease of capacitance of the second capacitor due to increase of distance between the pixel electrodes 11 and a common electrode 2 when a color resistance layer 4 is fabricated between the pixel electrodes 11 and the common electrode 2, and to ensure stability of a display image.

In some embodiments, the first capacitance is set to be smaller than a second capacitance formed by the pixel electrodes 11 and the common electrode 2, so as to prevent the first capacitance from being too large to cause a lower charging rate of the first capacitance and the second capacitance, that is, the first capacitance and the second capacitance cannot be charged to a required power within an original charging time, that is, a required voltage cannot be reached.

In some embodiments, a width of the first groove 13 is equal to a width of the second groove 14, and a depth of the first groove 13 is equal to a depth of the second groove 14. The width refers to a length of an edge of a surface where the first groove 13 and the second groove 14 are adjacent to each other, and a length of the other edge of the surface is a depth of the corresponding groove. It can be known that capacitance of a capacitor is calculated by the formula as follows:

$c = \varepsilon s / 4\pi k d$, wherein $\varepsilon$ is dielectric constant of an intermediate medium, s is an effective facing area of two plates, $\pi$ and k are constants, and d is a distance between the two plates.

It can be seen that the capacitance of a capacitor is generally related to the effective facing area between two electrode plates, the distance between two electrode plates, and dielectric constant of the intermediate medium of two electrode plates. Therefore, when other parameters are fixed, capacitance of the first capacitor formed by the data masking line 12 and the pixel electrodes 11 can be increased by increasing an effective facing area of the data masking line 12 and the pixel electrodes 11, thus setting an area of an edge of the first groove 13 equal to an area of an edge of the second groove 14 adjacent to each other means maximizing the effective facing area, that is, maximizing the capacitance of the capacitor.

In some embodiments, a thickness of the color resistance layer 4 is from 2 μm to 3 μm, and a depth of the first groove and the second groove is from 0.5 μm to 2 μm. It can be known that, in order to prevent short circuit, the depth of the first groove 13 and the second groove 14 cannot exceed the thickness of the color resistance layer. Specifically, the depth of the first groove 13 and the second groove 14 is 0.7 μm, that is, the depth of the pixel electrodes 11 and the data masking line 12 inserted into the color resistance layer 4 is 0.7 μm, and the thickness of the color resistance layer 4 is 2.3 μm.

In some embodiments, the data masking line 12 and the pixel electrodes 11 are disposed in the same layer and made of the same material. Specifically, a material of the data masking line 12 and the pixel electrodes 11 is selected from any one of indium-tin-oxide (ITO), indium gallium zinc oxide (IGZO), and ITO/Ag/ITO laminated material. It can be known that the material of the data masking line 12 and the pixel electrodes 11 comprises a transparent conductive material commonly used in the art.

In some embodiments, a data line 6 is further disposed between the common electrode 2 and the color resistance layer 4. It can be known that the data masking line 12 is used to form an electric field with the common electrode 2 to keep liquid crystals in an area corresponding to the data masking line 12 in the display panel in a non-deflecting state, so as to achieve purpose of shielding light, and a projection of the data line 6 on the substrate layer 1 is located within a projection range of the data masking line on the substrate layer 1. The data line 6 generally has a length of 5 μm to 10 μm, specifically, the data line 6 has a length of 8 μm. The data masking line 12 generally has a length two microns beyond the data line 6 on one side, specifically, when the data line 6 has a length of 8 μm, the data masking line 12 has a length of 12 μm.

This embodiment provides a display panel comprising an array substrate shown in the above embodiments. It can be known that the display panel comprises a display area and a non-display area, wherein the display area may be an area for disposing sub-pixels for displaying an image, and the non-display area may be an area for disposing a driving unit, such as a gate driving circuit which provides driving signals for pixel driving circuit of the sub-pixels, and some lines, such as power lines, for connecting the driving unit. Sub-pixels may not be disposed in the non-display area. The non-display area may be disposed on at least one side of the display area. The non-display area may at least partially surround periphery of the display area.

The non-display area may be disposed on at least one side of the display area. The non-display area may at least partially surround periphery of the display area.

It can be known that the display area comprises an opening area and a non-opening area, the gate 5, the gate line, the drain 9, and the source 8 are all located in the non-opening area, the pixel electrodes 11 and the common electrode 2 are all located in the opening area, the color resistance layer 4 covers both the opening area and the non-opening area, and position of the film layer is known to a person skilled in the art, and it is only explained by way of an example, so details will not be repeated here.

In conclusion, although the above-mentioned embodiments have been disclosed in the present application, the above-mentioned embodiments are not intended to limit the present invention, and those skilled person in the art may make various changes and modifications without departing from spirit and scope of the present invention, so protection scope of the present invention is subject to the scope defined by the claims.

What is claimed is:

1. An array substrate, comprising:
    a substrate layer on which a common electrode layer is formed;
    an insulating layer formed on the common electrode layer;
    a passivation layer formed on the insulating layer;
    a color resistance layer formed on the passivation layer for filtering light, and a first groove and a second groove are formed on a side surface of the color resistance layer away from the substrate layer;
    a data masking line layer comprising a data masking line formed on the color resistance layer, and a part of the data masking line is located in the first groove; and
    a pixel electrode layer comprising pixel electrodes formed on the color resistance layer and disposed insulated from the data masking line, and a part of the pixel electrodes are located in the second groove to form a first capacitance with the part of the data masking line in the first groove;
    wherein the pixel electrodes form a second capacitance with the common electrode layer, and the first capacitance is smaller than the second capacitance wherein an orthographic projection of the common electrode layer on the substrate layer is located between an orthographic projection of the first groove on the substrate layer and an orthographic projection of the second groove on the substrate layer.

2. The array substrate according to claim 1, wherein a width of the first groove is equal to a width of the second groove.

3. The array substrate according to claim 2, wherein a depth of the first groove is equal to a depth of the second groove.

4. The array substrate according to claim 3, wherein the color resistance layer has a thickness of 2 µm to 3 µm.

5. The array substrate according to claim 4, wherein the depth of the first groove and the second groove is from 0.5 µm to 2 µm.

6. The array substrate according to claim 1, wherein the data masking line and the pixel electrodes are disposed in the same layer.

7. The array substrate according to claim 6, wherein a material of the data masking line is the same as that of the pixel electrodes.

8. The array substrate according to claim 5, wherein the material of the data masking line and the pixel electrodes is selected from any one of ITO, IGZO, and ITO/Ag/ITO laminated material.

9. The array substrate of claim 8, wherein in the first direction, the reinforcement part protrudes from opposite sides of the first body.

10. A method for fabricating an array substrate, comprising steps of:
    forming a common electrode layer on a substrate layer;
    forming an insulating layer on the common electrode layer;
    forming a passivation layer on the insulating layer;
    forming a color resistance layer on the passivation layer for filtering light, and forming a first groove and a second groove on a side surface of the color resistance layer away from the substrate layer; and
    forming a data masking line layer and a pixel electrode layer on the color resistance layer, wherein a part of the data masking line layer is formed in the first groove, and a part of the pixel electrode layer is formed in the second groove and forms a first capacitance with the part of the data masking line layer in the first groove, wherein a part of the pixel electrode layer forms a second capacitance with the common electrode layer, and the first capacitance is smaller than the second capacitance wherein the common electrode layer, the first groove, and the second groove are formed such that an orthographic projection of the common electrode layer on the substrate layer is located between an orthographic projection of the first groove on the substrate layer and an orthographic projection of the second groove on the substrate layer.

11. The method according to claim 10, wherein before the step of forming a color resistance layer on the common electrode layer, the method further comprises steps of:
    forming an active layer on the insulating layer;
    forming a source and a drain on the active layer; and
    forming a passivation layer on the source and drain layer.

12. The method according to claim 11, wherein a data line is further formed when forming the source and drain.

13. The method according to claim 11, wherein the step of forming a data masking line layer and a pixel electrode layer on the color resistance layer comprises forming a data masking line in the first groove and forming pixel electrodes in the second groove such that the pixel electrodes are disposed insulated from the data masking line.

14. The method according to claim 11, wherein the step of forming a data masking line layer and a pixel electrode layer on the color resistance layer comprises forming the data masking line layer and the pixel electrode layer on the same layer with the same material.

15. A display panel comprising the array substrate according to claim 1.

16. The array substrate according to claim 1, wherein the part of the data masking line in the first groove and the part of the pixel electrodes in the second groove are separated by a first distance to form the first capacitance, and the pixel electrodes and the common electrode layer are separated by a second distance to form the second capacitance, wherein the second distance depends on a depth of the second groove and a thickness of the color resistance layer.

17. The method according to claim 11, wherein the part of the data masking line layer in the first groove and the part of the pixel electrode layer in the second groove are separated by a first distance to form the first capacitance, and the pixel electrodes and the common electrode layer are separated by a second distance to form the second capacitance, wherein the second distance depends on a depth of the second groove and a thickness of the color resistance layer.

* * * * *